N. CORNFIELD.
VEHICLE WHEEL.
APPLICATION FILED SEPT. 26, 1910.
1,163,509.
Patented Dec. 7, 1915.
2 SHEETS—SHEET 1.
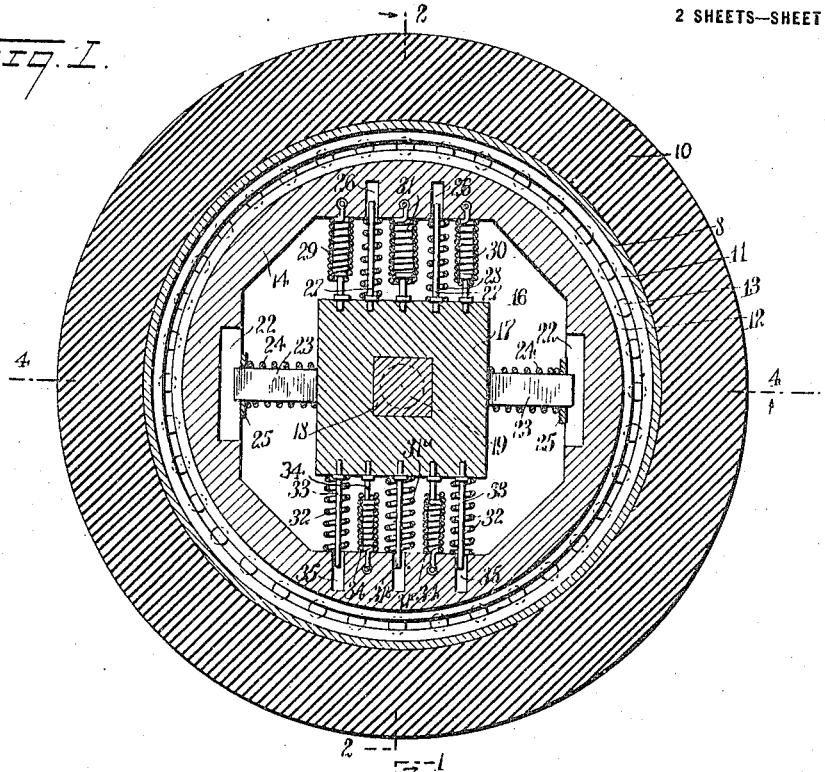
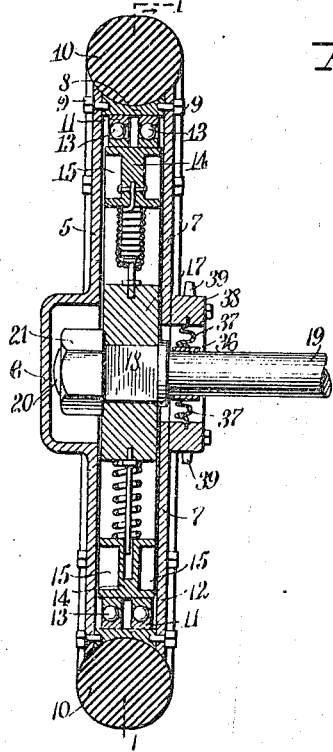
WITNESSES:
H. T. Walker
W. Harrison
INVENTOR
Noah Cornfield
BY Munn & Co.
ATTORNEYS N. CORNFIELD.
VEHICLE WHEEL.
APPLICATION FILED SEPT. 26, 1910.
1,163,509.
Patented Dec. 7, 1915.
2 SHEETS—SHEET 2.
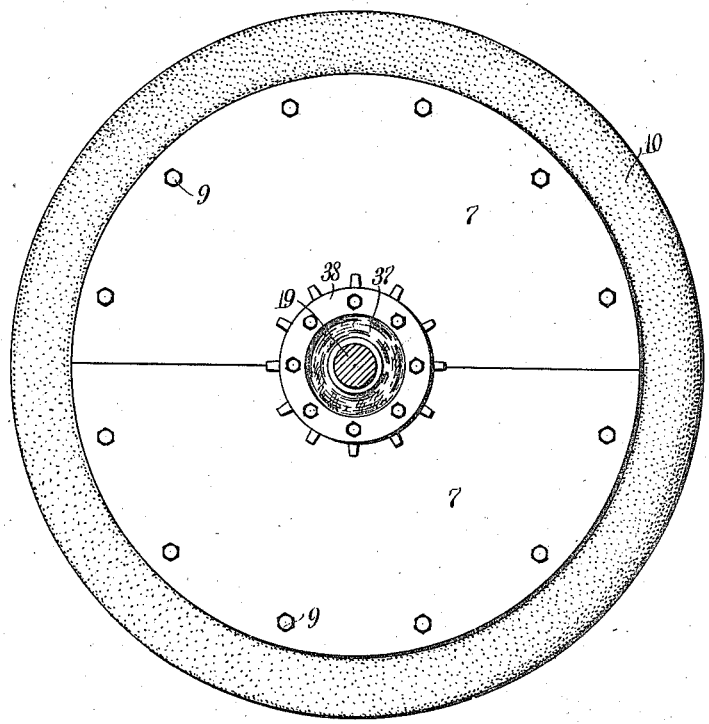
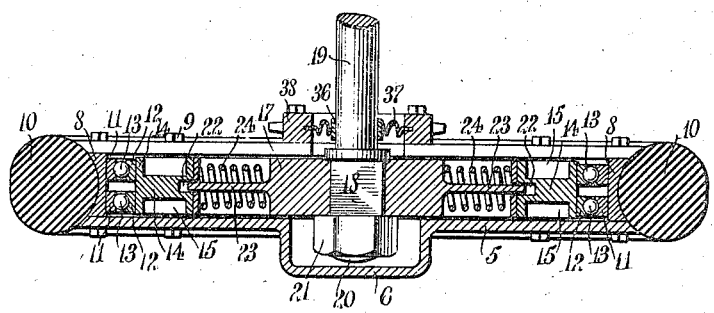
WITNESSES:
H. J. Walker
W. Harrison
INVENTOR
Noah Cornfield
BY
ATTORNEYS

UNITED STATES PATENT OFFICE.

NOAH CORNFIELD, OF NEW YORK, N. Y., ASSIGNOR OF ONE-HALF TO SIMON T. HARRIS, OF NEW YORK, N. Y.

VEHICLE-WHEEL.

1,163,509.          Specification of Letters Patent.          Patented Dec. 7, 1915.

Application filed September 26, 1910. Serial No. 583,792.

*To all whom it may concern:*

Be it known that I, NOAH CORNFIELD, a citizen of the United States, and a resident of the city of New York, borough of Manhattan, in the county and State of New York, have invented a new and Improved Vehicle-Wheel, of which the following is a full, clear, and exact description.

My invention relates to vehicle wheels, my more particular purpose being to provide a wheel with springs suitably arranged for taking up the play of the axle, and performing generally the office of a pneumatic tire.

More particularly stated, I provide a wheel having a non-revoluble central portion of comparatively large size, and connect the axle centrally with its portion and arrange around said portion a member revoluble relatively to the same and free to turn thereupon; the axle and parts secured rigidly thereupon being connected with said central member by aid of suitable springs, which allow a play of the axle relatively to the outer portions of the wheel.

Reference is to be had to the accompanying drawings forming a part of this specification, in which similar characters of reference indicate corresponding parts in all the views, and in which—

Figure 1 is a section on the line 1—1 of Fig. 2 looking in the direction of the arrow; Fig. 2 is a section on the line 2—2 of Fig. 1 looking in the direction of the arrow; Fig. 3 is an elevation showing the inner face of the wheel; and Fig. 4 is a section on the line 4—4 of Fig. 1 looking in the direction of the arrow.

A disk 5 comprises practically the outer face of the wheel and is provided with a pocket 6, having the general outer appearance of a hub. The inner face 7 of the wheel is made in halves and has generally the form of a disk.

At 8 is a rim which is sandwiched between the outer face 5 and the inner face 7.

At 9 are bolts for connecting the rim 8 with the inner and outer faces of the wheel. A tire 10 fits against the rim 8 and engages the adjacent edges of the inner and outer faces. Disposed within the rim 8 are two annular members 11, the surfaces of which are suitably formed to constitute ball races. Inside of these annular members 11 are two other members 12 also formed into ball races. Between the annular members 11—12 are two rows of balls 13.

At 14 is a rim support having the general form indicated in Fig. 1 and provided with passages 15 whereby its weight is lessened. The rim support 14 is provided internally with the large aperture 16 having generally an annular form as will be understood from Fig. 1.

At 17 is a block through which extends a square portion 18 of the axle which is shown at 19. The axle does not turn and consequently the square portion 18 has a fixed position relatively to the vehicle body. The axle is provided with a reduced portion 20 upon which fits a nut 21, the latter being forced tightly against the block 17 to hold the latter securely in position. The rim support 14 is provided internally with two slots 22, disposed oppositely to each other. The block 17 carries two guide blades 23 extending in opposite directions into the slots 22. Each blade 23 is encircled by a spiral spring 24, and presses against the block 17 and also against a plate 25, the latter being loose relatively to the rim support 14. This rim support is further provided with slots 26, and the block 17 is provided with pins 27, which extend through compression springs 28 and into the slots 26. The pins 27 have no appreciable play in the slots 26, except in the general direction of the plane of the wheel and in the general direction of the length of the pins.

At 29—30—31 are suspension springs which are connected with the block 17 and also with the upper portion of the rim support 14. Below the block 17 is a compression spring 31$^a$, and extending through the same is a guide pin 31$^b$, which reaches into a slot 31$^c$.

At 32 are compression springs, and extending through the same are guide pins 33.

At 34 are tensile springs which reach from the block 17 to the lower inner surface of the rim support 14. The tensile springs 34 terminate in end portions of wire which are secured directly to the block 17, the opposite ends of the springs being connected with the support 14. These tensile springs 34 are not so closely wound as to unduly restrict movements of the block 17. The guide pins 33 extend into slots 35 which are somewhat similar to the slots 26 and allow the guide pins a limited play in two directions, their play being practically limited, however, in the direction crossing the general plane of the wheel.

Encircling the axle 19 and revoluble relatively to the same, is a ring 36. Concentric to this ring is an annular sprocket 38. A diaphragm 37 made of corrugated leather is connected with the annular sprocket 38 and with the ring 36, so as to form therebetween a dust proof connection. The diaphragm 37 being corrugated, as indicated in Fig. 4, allows the annular sprocket 38 more or less play relatively to the axle, and as the ring turns freely upon the non-revoluble axle and fits the same practically dust proof, the entire outer portion of the wheel turns.

The operation of my device is as follows: The parts being assembled as above described, and the vehicle being drawn over the ground, the outer portion of the wheel, that is the tire 10 and rim 8, together with the inner and outer faces, turn as a unit upon the ball bearings. While this is the case, the block 17 has considerable play vertically, and a slight play forward and backward—that is in the general direction in which the vehicle is traveling—but little or no play in a direction crossing the general plane of the wheel. The guide blades 23 fit neatly into the slots 22 so as to prohibit any appreciable play in a lateral direction, while allowing the block 17 considerable movement up and down, and a slight movement forward or backward, reckoned according to the general direction in which the wheel is traveling. The wheel rim support 14 has a resilient relation to the block 17 and yet serves as a non-revoluble member upon which the outer portions of the wheel are free to turn.

I do not limit myself to the precise construction above described, neither do I limit myself to the employment of any special materials in the construction of this wheel, the scope of my invention being commensurate with my claim.

The wheel above described is absolutely dust proof, both at the annular joint where the rim engages the disks and at the proximate center of the wheel, where the leather diaphragm is secured to the sprocket ring and connected with the axle. While I may employ various expedients to exclude the entrance of dust at the points mentioned, I do not consider this as necessary, a neat fitting of the parts described being sufficient.

Having thus described my invention, I claim as new and desire to secure by Letters Patent.

The combination of a non-rotary rectangular block; a non-rotary open-centered ring member surrounding said block in a plane coincident therewith; a rotary ring member, embodying a wheel tire and felly surrounding said non-rotary ring member in spaced relation thereto; a plurality of rolling members interposed between said ring members to form a bearing in said rotary ring member and to maintain the spaced relation of said members; and a plurality of springs interposed between said non-rotary ring member and said block, said springs being disposed at the four sides of said block and said springs being graduated with reference to the disposition, the load supporting springs being disposed below said block, shock-absorbing springs being disposed above said block and centering springs being disposed before and behind said block, said springs being balanced to normally maintain the said block concentric with said ring members under predetermined load conditions imposed on said block.

In testimony whereof I have signed my name to this specification in the presence of two subscribing witnesses.

NOAH CORNFIELD.

Witnesses:
WALTON HARRISON,
PHILIP D. ROLLHAUS.